US011628646B2

(12) United States Patent
Mason et al.

(10) Patent No.: US 11,628,646 B2
(45) Date of Patent: Apr. 18, 2023

(54) COMPOSITE PANELS INCLUDING AN AESTHETIC EDGE

(71) Applicant: HANWHA AZDEL, INC., Forest, VA (US)

(72) Inventors: Mark J Mason, Highland, MI (US); Peter T Evers, Jr., Byron, MI (US); Anthony J Messina, Macomb Township, MI (US)

(73) Assignee: Hanwha Azdel, Inc., Forest, VA (US)

( * ) Notice: Subject to any disclaimer, the term of this patent is extended or adjusted under 35 U.S.C. 154(b) by 133 days.

(21) Appl. No.: 16/841,118

(22) Filed: Apr. 6, 2020

(65) Prior Publication Data

US 2020/0398518 A1  Dec. 24, 2020

Related U.S. Application Data

(60) Provisional application No. 62/830,260, filed on Apr. 5, 2019.

(51) Int. Cl.

| | | |
|---|---|---|
| *B32B 3/04* | (2006.01) | |
| *B32B 5/10* | (2006.01) | |
| *B32B 5/18* | (2006.01) | |
| *B32B 27/06* | (2006.01) | |
| *B62D 25/20* | (2006.01) | |

(52) U.S. Cl.
CPC .............. *B32B 3/04* (2013.01); *B32B 5/10* (2013.01); *B32B 5/18* (2013.01); *B32B 27/065* (2013.01); *B62D 25/2054* (2013.01); *B32B 2605/003* (2013.01)

(58) Field of Classification Search
None
See application file for complete search history.

(56) References Cited

U.S. PATENT DOCUMENTS

| | | | |
|---|---|---|---|
| 2006/0134371 A1 | 6/2006 | Dubey | |
| 2007/0095459 A1 | 5/2007 | Smith | |
| 2013/0280469 A1* | 10/2013 | Preisler | ................... B32B 3/04 428/72 |
| 2017/0326863 A1 | 11/2017 | Boeing | |

FOREIGN PATENT DOCUMENTS

| | | |
|---|---|---|
| WO | 200228709 | 4/2002 |
| WO | 2017094254 | 6/2017 |

OTHER PUBLICATIONS

ISR/WO for PCT/US20/26875 dated Jul. 16, 2020.

* cited by examiner

*Primary Examiner* — Alexander S Thomas
(74) *Attorney, Agent, or Firm* — Rhodes IP PLC; Christopher R Rhodes

(57) ABSTRACT

Certain configurations of composite panels are described that comprise at least one aesthetic edge. In some embodiments, the composite panel with the aesthetic edge comprises a sandwich panel coupled to a shell layer. The sandwich panel may comprise skin layers and a core layer.

20 Claims, 6 Drawing Sheets

COMPOSITE PANELS INCLUDING AN AESTHETIC EDGE

PRIORITY APPLICATION

This application is related to, and claims priority to and the benefit of, U.S. Provisional Application No. 62/830,260 filed on Apr. 5, 2019, the entire disclosure of which is hereby incorporated herein by reference for all purposes.

TECHNOLOGICAL FIELD

Certain configurations described herein are directed to composite panels that comprise an aesthetic edge. More particularly, certain embodiments are described of a composite panel that comprises a sandwich panel coupled to a shell layer to provide a composite article with an aesthetic edge.

BACKGROUND

Composite articles are often used in various applications. The edges of composite articles can often be unsightly as a result of the processes and/or materials used to prepare the composite articles.

SUMMARY

Certain aspects, configurations and examples of composite articles are described that comprise an aesthetic edge. The composite panel may comprise two or more aesthetic edges if desired. The composite article can be used in many different final articles including, but not limited, vehicle load floors, structural panels, recreational vehicle tables, recreational vehicle storage doors or panels and in other vehicular and non-vehicular applications.

In an aspect, a composite article comprises a sandwich panel comprising a first skin comprising a thermoplastic material and reinforcing fibers, a second skin comprising a thermoplastic material and reinforcing fibers, and a core layer positioned between the first skin and the second skin, and a shell layer coupled to the sandwich panel through the second skin, wherein the shell layer and sandwich panel together provide an aesthetic edge to the composite article.

In certain embodiments, a basis weight of the shell layer and the second skin together are a same basis weight or a different basis weight as a basis weight of the first skin. In some embodiments, the composite article comprises four sides with a first side being opposite a third side and a second side being opposite a fourth side, wherein the second skin is arranged in a machine direction from the first side to the third side, and wherein the shell layer is arranged in a machine direction from the second side to the fourth side. In other examples, the composite article comprises an air gap at the aesthetic edge, wherein the air gap is present between the shell layer and the second skin.

In some instances, the composite article comprises at least two aesthetic edges each with an air gap, wherein each of the air gaps is present between the shell layer and the second skin.

In some configurations, the reinforcing fibers in each of the first skin and the second skin comprises one or more of wherein the reinforcing fibers in each of the first skin and the second skin comprises one or more of glass fibers, carbon fibers, graphite fibers, synthetic organic fibers, particularly high modulus organic fibers such as, for example, para- and meta-aramid fibers, nylon fibers, polyester fibers, mineral fibers such as basalt, mineral wool fibers, wollastonite, alumina silica, metal fibers, metalized natural and/or synthetic fibers, ceramic fibers, yarn fibers, or mixtures thereof. In other examples, the thermoplastic material in each of the first skin and the second skin comprises a polyolefin material.

In some embodiments, the composite article comprises a decorative layer coupled to the first skin of the sandwich panel. In other examples, the core layer comprises a cellulose material or a non-cellulose material. In further embodiments, a thickness of the composite article is about 5 mm to about 100 mm.

In another aspect, a vehicle load floor sized and arranged to cover a rear interior section of a vehicle comprises a decorative layer facing an interior of the vehicle, and a load floor substrate coupled to the decorative layer, the load floor substrate comprising a sandwich panel coupled to the decorative layer, the sandwich panel comprising a first skin comprising a thermoplastic material and reinforcing fibers, a second skin comprising a thermoplastic material and reinforcing fibers, and a core layer positioned between the first skin and the second skin, and a shell layer coupled to the sandwich panel through the second skin, wherein the vehicle load floor comprises an aesthetic edge.

In certain examples, a basis weight of the shell layer and the second skin together are a same basis weight or a different basis weight as a basis weight of the first skin. In other examples, the load floor substrate comprises four sides with a first side being opposite a third side and a second side being opposite a fourth side, wherein the second skin is arranged in a machine direction from the first side to the third side, and wherein the shell layer is arranged in a machine direction from the second side to the fourth side.

In some embodiments, the vehicle load floor comprises at least one aesthetic edge with an air gap, wherein the air gaps is present between the shell layer and the second skin. In some examples, the vehicle load floor comprises at least two aesthetic edges each with an air gap, wherein each of the air gaps is present between the shell layer and the second skin.

In certain examples, the reinforcing fibers in each of the first skin and the second skin comprises one or more of wherein the reinforcing fibers in each of the first skin and the second skin comprises one or more of glass fibers, carbon fibers, graphite fibers, synthetic organic fibers, particularly high modulus organic fibers such as, for example, para- and meta-aramid fibers, nylon fibers, polyester fibers, mineral fibers such as basalt, mineral wool fibers, wollastonite, alumina silica, metal fibers, metalized natural and/or synthetic fibers, ceramic fibers, yarn fibers, or mixtures thereof. In some embodiments, the thermoplastic material in each of the first skin and the second skin comprises a polyolefin material.

In certain configurations, the load floor comprises a second decorative layer coupled to an underside of the vehicle load floor. In some examples, the core layer comprises a cellulose material or a non-cellulose material. In other examples, a thickness of the vehicle load floor is about 5 mm to about 30 mm.

In an additional aspect, a structural panel comprises at least one interconnect, the structural panel comprising a sandwich panel comprising a first skin comprising a thermoplastic material and reinforcing fibers, a second skin comprising a thermoplastic material and reinforcing fibers, and a core layer positioned between the first skin and the second skin, and a shell layer coupled to the sandwich panel through the second skin, wherein the structural panel comprises an aesthetic edge at one side of the structural panel.

If desired, the structural panel may also comprise an air gap at the aesthetic edge, wherein the air gap is present between the shell layer and the second skin and is configured to receive the interconnect.

In some examples, the interconnect comprises an electrical wire. In other examples, the structural panel is configured as a table that is removable from a vehicle. In some embodiments, the interconnect comprises as a USB charging port. In other examples, the interconnect is electrically coupled to a battery in the structural panel. In additional examples, the interconnect is electrically coupled to a photovoltaic cell in the structural panel.

In some examples, the reinforcing fibers in each of the first skin and the second skin comprises one or more of glass fibers, carbon fibers, graphite fibers, synthetic organic fibers, particularly high modulus organic fibers such as, for example, para- and meta-aramid fibers, nylon fibers, polyester fibers, mineral fibers such as basalt, mineral wool fibers, wollastonite, alumina silica, metal fibers, metalized natural and/or synthetic fibers, ceramic fibers, yarn fibers, or mixtures thereof. In certain embodiments, the thermoplastic material in each of the first skin and the second skin comprises a polyolefin material.

In other instances, the structural panel comprises a decorative layer coupled to the first skin of the sandwich panel. In some embodiments, each edge of the structural panel comprises an aesthetic edge.

In another aspect, a method of producing a composite panel with an aesthetic edge is provided. In some examples, the method comprises coupling a pre-molded shell layer to a sandwich panel to provide the aesthetic edge, wherein the sandwich panel comprises a first skin comprising a thermoplastic material and reinforcing fibers, a second skin comprising a thermoplastic material and reinforcing fibers, and a core layer positioned between the first skin and the second skin.

In certain embodiments, the pre-molded shell layer is coupled to the second skin of the sandwich panel. In other embodiments, the coupling of the pre-molded shall layer to the second skin provides an air gap at the aesthetic edge between the second skin and the pre-molded shell layer. In some examples, the pre-molded shell layer comprises a thermoplastic material and reinforcing fibers. In certain embodiments, the second skin comprises a different fiber orientation than a fiber orientation of the reinforcing fibers in the shell layer. In some embodiments, each skin of the sandwich panel is produced using a wet laid process. In other embodiments, each of the first and second skins comprises a polyolefin and glass reinforcing fibers, and the core comprises a paper honeycomb. In additional examples, each of the first and second skins comprises a polyolefin and glass reinforcing fibers, and the core comprises a non-cellulose core.

Additional aspects, configurations, examples and embodiments are described below.

It will be recognized by the person having ordinary skill in the art, given the benefit of this disclosure, that the dimensions of the various layers in the figures are not shown to scale. No particular layer thickness or dimensions are intended or implied unless made clear from the specific description in connection with that particular layer or other component. The exact dimensions will vary depending on the final configuration of the article and/or its intended use.

DETAILED DESCRIPTION

Figure 1A:
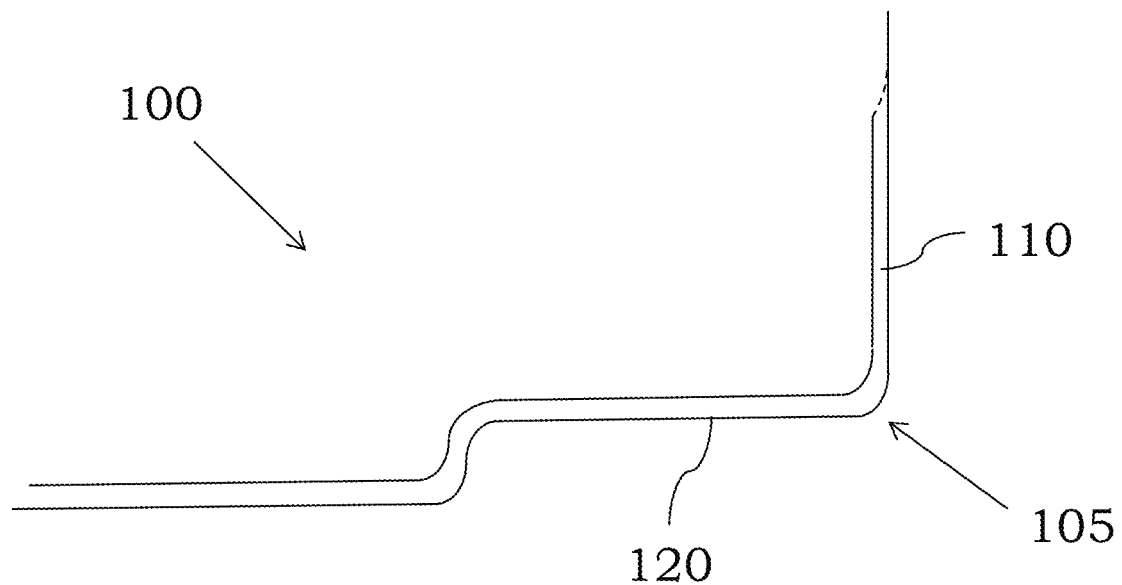
FIG. 1A is an illustration of an aesthetic edge at a side of a composite panel, in accordance with some embodiments.
Figure 1B:
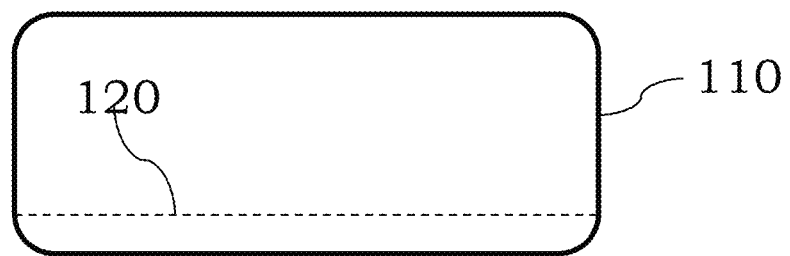
FIG. 1B is illustration of several faces of an aesthetic edge, in accordance with some configurations.

Certain configurations of composite panels with an aesthetic edge are described. The phrase "aesthetic edge" generally refers to an edge that comprises a directional change when viewed in cross-section. For example and referring to FIG. 1A, a panel 100 comprising an aesthetic edge is shown that includes a first face 110 that is coupled to a second face 120 through a rounded edge or tight radius bend 105. While not required, the first face 110 can be generally orthogonal to the second face 120, though the faces 110, 120 can arranged at other angles if desired. When viewed from the first face 110 or side of the panel 100, the second face 120 is generally not visible but is shown as dashed line in FIG. 1B for reference purposes. In contrast to existing composite panels, which have curved edges or sharp edges that tend to be rough, bumpy or bridged, the aesthetic edge is generally non-bridged and provides a more rounded edge that couples the faces of the panel. The aesthetic edge can generally be characterized by a change in direction of the edge with the edge being configured as a rounded bend rather than a sharp edge or rather than a generally curved edge from a top surface of the panel to a bottom surface of the panel.

Figure 2:
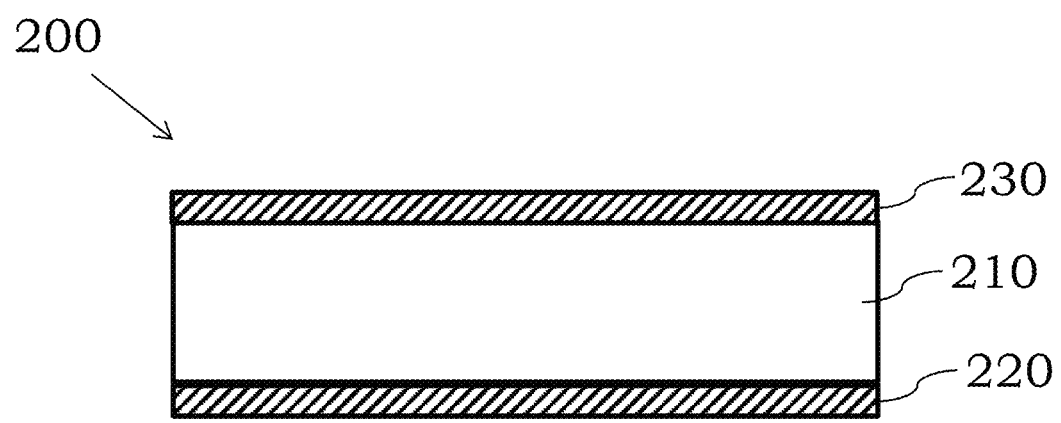
FIG. 2 is an illustration of a sandwich panel, in accordance with some embodiments.

In some examples, the aesthetic edge can be produced by coupling a sandwich panel to shell layer, which can be pre-molded and produced separately from the composite panel or can be produced along with the composite panel. Referring to FIG. 2, a cross-section of a sandwich panel 200 is shown. The sandwich panel 200 generally comprises a first skin 220, a second skin 230 and a core layer 210 between the first skin 220 and the second skin 230. In some examples, the fibers of the skin layers 220, 230 may be arranged in similar or different directions, e.g., one of the skins 220, 230 may comprise fibers which are parallel to a machine direction of the skin and the other skin may comprise fibers which are parallel to a cross direction of the skin. In certain instances, the skin layers 220, 230 may generally comprise the same materials but may have different amounts of the materials, e.g., different amounts of reinforcing fibers and/or different amounts of thermoplastic materials. In other examples, the skin layers 220, 230 may comprise the same thermoplastic material but different reinforcing fibers. In additional configurations, the skin layers 220, 230 may comprise the same reinforcing fibers but different thermoplastic materials. In other instances, the skin layers 220, 230 may comprise the same reinforcing materials and thermoplastic materials but have a different basis weight, a different porosity or other different physical properties. In some examples, the skin layers 220, 230 may comprise the same reinforcing fibers and same thermoplastic materials but have a different thickness or a different amount of a lofting agent to provide for variable lofting capacities.

In certain examples, each of the skin layers 220, 230 may independently be configured similar to the skin layer 120, e.g., each of the skin layers 220, 230 may be a glass mat thermoplastic (GMT) skin or a lightweight reinforced thermoplastic (LWRT) skin. For example, each of the skin layers 220, 230 may be configured as a LWRT skin comprising one or more thermoplastic materials. In some examples, the thermoplastic material present in each of the layers 220, 230 may independently comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4-phenylene) compounds commercially known as PARMAX®, high heat polycarbonate such as Bayer's APEC® PC, high temperature nylon, and silicones, as well as copolymers, alloys and blends of these materials with each other or other polymeric materials. The thermoplastic material used to form the layers 220, 230 can be used in powder form, resin form, rosin form, particle form, fiber form or other suitable forms, and the form used in the different layers 220, 230 need not be the same. Illustrative thermoplastic materials in various forms are described herein and are also described, for example in U.S. Publication Nos. 20130244528 and US20120065283. The exact amount of thermoplastic material present in the skin layers 220, 230 can vary and illustrative amounts range from about 20% by weight to about 80% by weight, e.g., 30-70 percent by weight or 35-65 percent by weight. As noted herein, the amount of thermoplastic material present in the skins 220, 230 need not be the same In certain examples, the reinforcing fibers of the skin layers 220, 230 may independently comprise glass fibers, carbon fibers, graphite fibers, synthetic organic fibers, particularly high modulus organic fibers such as, for example, para- and meta-aramid fibers, nylon fibers, polyester fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. In some instances, fibers in one of the skin layers 220, 230 are chemically treated and fibers in the other one of the skin layers 220, 230 are not chemically treated. The fiber content in each of the layers 220, 230 may independently be from about 20% to about 90% by weight of the layer, more particularly from about 30% to about 70%, by weight of the layer. Typically, the fiber content of a sandwich panel comprising the skin layers 220, 230 varies between about 20% to about 90% by weight, more particularly about 30% by weight to about 80% by weight, e.g., about 40% to about 70% by weight of the assembly. The particular size and/or orientation of the fibers used may depend, at least in part, on the thermoplastic polymer material used and/or the desired properties of the skin layers 220, 230. Suitable additional types of fibers, fiber sizes and amounts will be readily selected by the person of ordinary skill in the art, given the benefit of this disclosure. In one non-limiting illustration, fibers dispersed within a thermoplastic material and optionally a lofting agent to provide the skin layers 220, 230 can generally have a diameter of greater than about 5 microns, more particularly from about 5 microns to about 22 microns, and a length of from about 5 mm to about 200 mm, more particularly, the fiber diameter may be from about microns to about 22 microns and the fiber length may be from about 5 mm to about 75 mm.

In certain embodiments, the skin layers 220, 230 may comprise a different fiber material or a different fiber loading. Where different fiber materials are present, the fibers may be different fibers entirely, e.g., glass fibers in one layer and carbon fibers in another layer, or may comprise the same base material that has been modified, e.g., glass fibers in one layer and chemically treated glass fibers in another layer. In some instances, the fibers may be the same fiber material but one or more physical properties of the fibers may differ. For example, the fibers of the layer 220 may have a first diameter that differs from a diameter of the fibers present in the layer 230 even though the fiber material in the layers 220, 230 may be the same or different. In other instances, the length of the fibers in the layer 220 may differ from a length of the fibers present in the layer 230 even though the fiber material present in the layers 220, 230 may be the same or different. In additional examples, both the length and diameter of the fiber in the layer 220 may differ from a length and diameter of the fibers in the layer 230 even though the fiber material present in the layers 220, 230 may be the same or different. In yet other examples, two or more different fibers may be used in one of the layers 220, 230 and a single type of fibers may be present in the other layer. By selecting the amount and/or type and/or direction of fibers, it is possible to vary the physical properties of the skin layers 220, 230, e.g., to provide a different lofting capacity for different skin layers of the assembly.

In some embodiments, the reinforcing fibers form a web that is held in place by the thermoplastic material of the skins 220, 230. The web is generally porous. In some instances, the pores of each skin 220, 230 may comprise additives including flame retardants, particles or other materials. Illustrative basis weights for the each of the skins 220, 230 include, but are not limited to, about 100 grams per square meter (gsm) to about 2000 gsm, more particularly about 300 gsm to about 1500 gsm or about 500 gsm to about 1200 gsm. The skins 220, 230 need not have the same basis weights in the composite article. In some examples, each skin layer 220, 230 may first be formed as a prepreg which is generally a precursor to the skin and is not necessarily fully formed. The skins typically are porous to permit gases to flow through the skins. For example, the skins 220, 230 may each comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the skins 220, 230 comprise a porosity or void content of greater than 0%, e.g., is not fully consolidated, up to about 95%.

In some examples, the core layer 210 may comprise a cellulose based material or a non-cellulose based material. For example, the core layer 210 may comprise a paper honeycomb or other core material comprising cellulose fibers. The cellulose fibers can be present with or without other materials, e.g., may be present in combination with a thermoplastic material. In other examples, the core layer 210 may comprise a foam such as a polyurethane foam, which can be a closed cell foam or an open cell foam. Where the core layer 210 is a closed cell foam, the closed cell foam of the core layer 210 may comprise a porosity of less than about 5%, 4%, 3%, 2% or 1%.

In some embodiments, the core layer is not a sprayed or sprayable core layer but is instead a solid, planar layer which can be coupled to the skin layers 220, 230 post-formation of the core layer 210. In some examples, the core layer 210 may comprise one or more of a foam, a cardboard, or a paper honeycomb or combinations thereof. In other examples, the core layer 210 may comprise or be a polystyrene foam, an expanded or extruded polyolefin foam (e.g., extruded polyethylene or expanded polypropylene) or other foams. In some instances, the core layer 210 may lack any polyurethane materials and/or may lack any cellulose materials. Illustrative basis weights for the core layer 210 include, but are not limited to, about 300 gsm to about 2000 gsm, more particularly about 500 gsm to about 1900 gsm or about 500 gsm to about 1500 gsm.

In some embodiments, the core layer 210 may comprise a foam with a larger compressive strength in a cross direction than in a machine direction. For example, the core layer 210 may comprise a foam with directional compressive strength, e.g., one with a compressive strength that is different in orthogonal directions, to impart more stiffness to the overall article comprising the core layer 210 and the skin layers 220, 230. Foams which can provide directional compressive strength are commercially available from Dow Corning and other suppliers. The core layer 210 is typically first formed from the foam (or other material) and then coupled to the skin layers 220, 230. In some configurations, the material of the core layer 210 can be constructed and arranged to permit compression of the core layer 210 without substantial damage to the core layer 210. Materials in the core layer 210 can also be selected to permit the article 200 to be thermoformed, e.g., compressed, molded, etc., without substantial damage to the core layer 210. Compared to fiber thermoplastic core layers, at comparable basis weights the presence of a core layer 210 comprising a closed cell foam (or non-fiber reinforced thermoplastic materials) can provide better performance and higher strength.

In certain examples, the core layer 210 itself may be configured as a GMT material or a LWRT material. For example, the core layer 210 may comprise reinforcing fibers and a thermoplastic material as described in connection with the skins 220, 230. The thickness of the core layer 210 is typically larger than the thickness of the skins 220, 230, but this arrangement is not required. In some examples where the core layer 210 is configured as a LWRT material, the thermoplastic material present in the core layer 210 may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4-phenylene) compounds commercially known as PARMAX®, high heat polycarbonate such as Bayer's APEC® PC, high temperature nylon, and silicones, as well as copolymers, alloys and blends of these materials with each other or other polymeric materials. The thermoplastic material used to form the core layer 210 can be used in powder form, resin form, rosin form, particle form, fiber form or other suitable forms. Illustrative thermoplastic materials in various forms are described herein and are also described, for example in U.S. Publication Nos. 20130244528 and US20120065283. The exact amount of thermoplastic material present in the skin layers 220, 230 can vary and illustrative amounts range from about 20% by weight to about 80% by weight, e.g., 30-70 percent by weight or 35-65 percent by weight.

In certain examples, the reinforcing fibers of the core layer 210 may independently comprise glass fibers, carbon fibers, graphite fibers, synthetic organic fibers, particularly high modulus organic fibers such as, for example, para- and meta-aramid fibers, nylon fibers, polyester fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. In some instances, fibers in the core layer 210 can be chemically treated. The fiber content in the core layer 210 may be from about 20% to about 90% by weight of the layer, more particularly from about 30% to about 70%, by weight of the layer. Typically, the fiber content of the core layer 210 varies between about 20% to about 90% by weight, more particularly about 30% by weight to about 80% by weight, e.g., about 40% to about 70% by weight of the core layer 210. The particular size and/or orientation of the fibers used may depend, at least in part, on the thermoplastic polymer material used and/or the desired properties of the core layer 210. Suitable additional types of fibers, fiber sizes and amounts will be readily selected by the person of ordinary skill in the art, given the benefit of this disclosure. In one non-limiting illustration, fibers dispersed within a thermoplastic material and optionally a lofting agent to provide the core layer 210 can generally have a diameter of greater than about 5 microns, more particularly from about 5 microns to about 22 microns, and a length of from about 5 mm to about 200 mm, more particularly, the fiber diameter may be from about microns to about 22 microns and the fiber length may be from about 5 mm to about 75 mm.

In certain examples, the core layer 210 may first be formed as a prepreg which is generally a precursor to the core layer 210 and is not necessarily fully formed. The core layer 210 is typically a porous structure to permit gases to flow through the core layer. For example, the core layer 210 may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the core layer 210 comprises a porosity or void content of greater than 0%, e.g., is not fully consolidated, up to about 95%.

In some configurations, the skin layers 220, 230 (and optionally the core layer 210) may be a substantially halogen free or halogen free layer to meet the restrictions on hazardous substances requirements for certain applications. In other instances, one or more of the layers 210, 220, 230 may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in one or more of the skin layers 220, 230 may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the layer), more particularly about 1 weight percent to about 13 weight percent, e.g., about 5 weight percent to about 13 weight percent. If desired, two different halogenated flame retardants may be added to the layers. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the layer), more particularly about 1 weight percent to about 13 weight percent, e.g., about 5 weight percent to about 13 weight percent based on the weight of the layer. If desired, two different substantially halogen free flame retardants may be added to one or more of the layers 210, 220, and 230. In certain instances, one or more of the layers 210, 220 and 230 may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the layer), more particularly about 1 weight percent to about 15 weight percent, e.g., about 2 weight percent to about 14 weight percent based on the weight of the layer. The flame retardant agents used in the layers described herein can be added to the mixture comprising the thermoplastic material and fibers (prior to disposal of the mixture on a wire screen or other processing component) or can be added after the layer is formed. In some examples, the flame retardant material may comprise one or more of expandable graphite materials, magnesium hydroxide (MDH) and aluminum hydroxide (ATH).

In the configuration shown in FIG. 2, the lofting capacity of the skin layers 220, 230 can be the same or can be different. The exact type of lofting agent used in the layers 220, 230 can depend on numerous factors including, for example, the desired lofting temperature, the desired degree of loft, etc. In some instances, microsphere lofting agents, e.g., expandable microspheres, which can increase their size upon exposure to convection heating may be used. Illustrative commercially available lofting agents are available from Kureha Corp. (Japan). In other instances, a first lofting agent with a first average particle size and a second lofting agent with a second average particle size, different from the first average particle size, may be used. In other examples, the lofting agent may be an expandable graphite material. The skin layers 220, 230 can be configured to provide the same lofting capacity or different lofting capacities. For example, upon exposure to heat or other lofting stimulus, the post-loft thickness of the layer 220 can be greater than that of the layer 230. For example, the thickness of the layer 220 prior to lofting may be about 1-2 mm and after lofting may be about 10-15 mm. The thickness of the layers 220, 230 prior to lofting may also be about 1-2 mm and after lofting may be about 6-8 mm. These thickness changes may occur even in the absence of any added lofting agent. For example and without wishing to be bound by any particular theory, during lofting the thermoplastic material may melt and release its hold on the reinforcing materials to permit the reinforcing materials to occupy more volume. Subsequent cooling of the thermoplastic material can result in reformation of a web of open celled structures with a larger volume than the pre-lofted web. By tuning the level of thermoplastic material and/or reinforcing materials in the layer 220 the degree to which the volume of the layer 220 can increase may be selected. In comparison, the amount of thermoplastic material and/or reinforcing materials present in the layer 230 can be selected such that melting of the thermoplastic material during lofting does not result in a substantial increase in the overall volume. As the web of the layer 230 reforms after lofting, the resulting post-lofted web volume is not substantially different from the pre-lofted web volume. If desired, one or more of the layers 220, 230 may include an added lofting agent to further increase the overall volume. For example, the layer 220 may comprise an added lofting agent to further select the overall post-lofted volume. In some instances, enough lofting agent is present so the post-lofted layer 220 (and/or the post-lofted layer 230) has a thickness of about 20-25 mm. In some examples, the layer 220 may comprise a polyolefin, reinforcing fibers and a lofting agent, and the layer 230 may comprise a polyolefin (which can be the same or different than the polyolefin in the layer 220) and a reinforcing material. In certain configurations, the polyolefin present in each of the layers 220, 230 may be polypropylene or a polyolefin copolymer comprising polypropylene. In some embodiments, the reinforcing material of each of the layers 220, 230 may comprise glass fibers optionally in combination with other fibers. The exact weight percentages of the thermoplastic material and reinforcing materials in each of the layers 220, 230 may vary, and illustrative weight percentages in the layers 220, 230 are about 40-60 weight percent thermoplastic material with the balance being reinforcing material. If desired, the skin layer 230 can be configured so it has a higher lofting capacity than the layer 220.

In some embodiments, an adhesive layer may or may not be present between the various layers shown in FIG. 2. For example, the layers can be coupled to each other without the use of an adhesive or an adhesive layer may be present between the core layer 210 and the skin 220 and/or between the core layer 210 and the skin 230. Where an adhesive layer is present, the adhesive layer can include, but is not limited to, thermoplastic adhesives including, but not limited to, pressure sensitive adhesives and hot melt adhesives, such as polyamides, modified polyolefins, urethanes and polyolefins. In some examples, the thermoplastic component of the adhesive layer may independently comprise a thermoplastic polymer such as, for example, a polyolefin such as a polyethylene or a polypropylene. In other instances, the thermoplastic polymer of the adhesive layer may independently comprise, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastic polymers for use in the adhesive layer can include, but is not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. If desired, the adhesive layers may also independently comprise some thermosetting material including, but not limited to, epoxides, epoxy resins, polyesters, polyester resins, urethanes, polyurethanes, diallyl-phthalates, polymides, cyanate esters, polycyanurates and combinations thereof.

Figure 3:
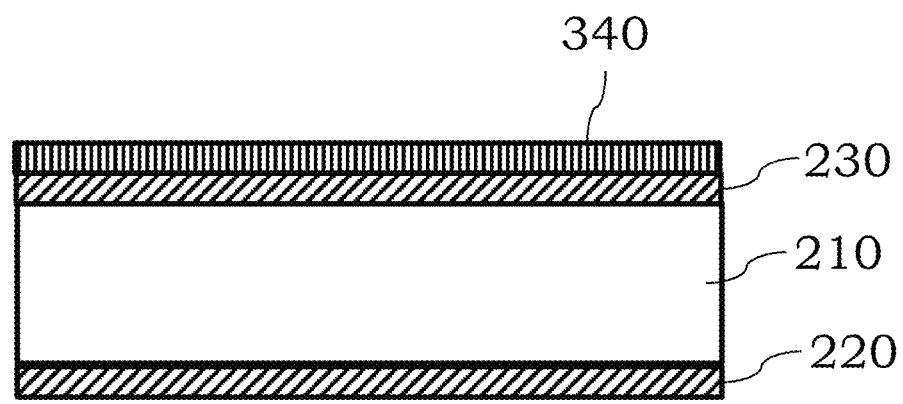
FIG. 3 is one illustration of a sandwich panel, in accordance with some embodiments.

In some examples and referring to FIG. 3, one or more surface layers may be present on a surface of the sandwich panel. As noted in more detail below, one skin layer of the sandwich panel is typically coupled to a shell layer, and the remaining skin layer may comprise a surface layer 340 as shown in FIG. 3. The layer 340 can take numerous forms and is typically different from the skin layer 230, e.g., may not be a fiber reinforced thermoplastic layer. In some embodiments, the layer 340 may take the form of a skin. The skin 340 may comprise, for example, a film (e.g., thermoplastic film or elastomeric film), a frim, a scrim (e.g., fiber based scrim), a foil, a woven fabric, a non-woven fabric or be present as an inorganic coating, an organic coating, or a thermoset coating. In other instances, the skin 340 may comprise a limiting oxygen index greater than about 22, as measured per ISO 4589 dated 1996. Where a thermoplastic film is present as (or as part of) the skin 340, the thermoplastic film may comprise at least one of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. Where a fiber based scrim is present as (or as part of) the skin 340, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the skin 340, the coating may comprise at least one of unsaturated polyurethanes, vinyl esters, phenolics and epoxies. Where an inorganic coating is present as (or as part of) the skin 340, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the skin 340, the non-woven fabric may comprise a thermoplastic material, a thermal setting binder, inorganic fibers, metal fibers, metallized inorganic fibers and metallized synthetic fibers. If desired, the skin 340 may also comprise a lofting agent as well. If desired, an adhesive layer (not shown) can be used to couple the layer 340 to the skin 230.

In certain instances, the layer 340 may be configured as a decorative layer. The decorative layer 340 may be formed, e.g., from a thermoplastic film of polyvinyl chloride, polyolefins, thermoplastic polyesters, thermoplastic elastomers, or the like. The decorative layer 340 may comprise a carpet, rubber or other aesthetic covering. The decorative layer 340 may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer 340 may also be produced using spunbond, thermal bonded, spun lace, melt-blown, wet-laid, and/or dry-laid processes. While not shown, a skin, e.g., scrim, film, decorative layer, etc. can also be coupled to the layer 220 if desired.

Figure 4:
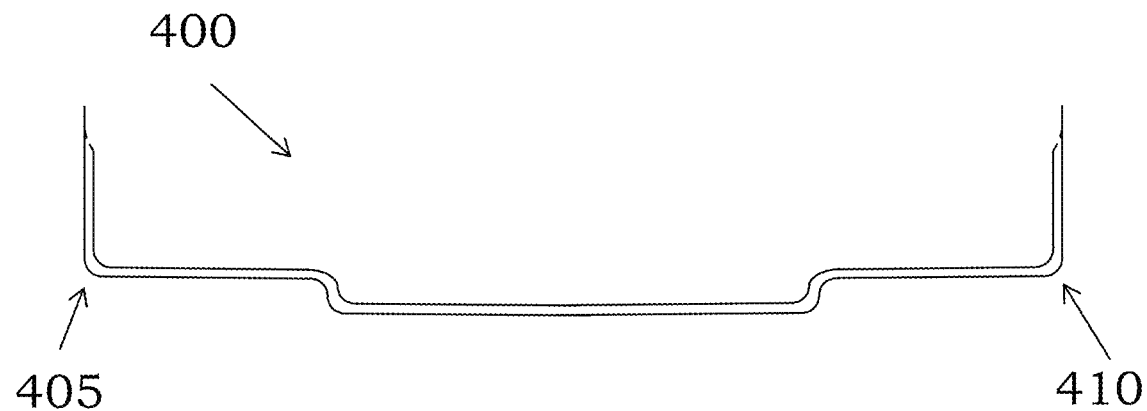
FIG. 4 is an illustration of a shell layer, in accordance with some embodiments.

In certain embodiments, the composite panel also typically comprises a shell layer that can be coupled to a skin layer of the sandwich panel. In certain examples, the shell layer 400 is typically a single layer of material, though if desired, the shell layer may comprise two or more separate layers. An illustration of a shell layer is shown in FIG. 4. The shell layer 400 is typically a pre-molded or pre-produced layer which is coupled to the sandwich panel to provide the composite panel with the aesthetic edge. For example, the shell layer 410 can be match molded to an outer surface of the sandwich panel to hide the rough or bump surfaces of the sandwich panel from view. While the panel 400 is shown as comprising aesthetic edges 405, 410, only one aesthetic edge may be present, or, depending on the configuration and intended use of the composite panel, each edge of the composite panel may comprise an aesthetic edge.

In certain configurations, the shell layer 400 itself may comprise a GMT material or a LWRT material. For example, the shell layer 400 may be configured as a LWRT article comprising one or more thermoplastic materials and reinforcing fibers. In some examples, the thermoplastic material present in the shell layer 400 may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, co-polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4-phenylene) compounds commercially known as PARMAX®, high heat polycarbonate such as Bayer's APEC® PC, high temperature nylon, and silicones, as well as copolymers, alloys and blends of these materials with each other or other polymeric materials. The thermoplastic material used to form the layer 400 can be used in powder form, resin form, rosin form, particle form, fiber form or other suitable forms. Illustrative thermoplastic materials in various forms are described herein and are also described, for example in U.S. Publication Nos. 20130244528 and US20120065283. The exact amount of thermoplastic material present in the layer 400 can vary and illustrative amounts range from about 20% by weight to about 80% by weight, e.g., 30-70 percent by weight or 35-65 percent by weight.

In certain examples, the reinforcing fibers of the layer 400 may independently comprise glass fibers, carbon fibers, graphite fibers, synthetic organic fibers, particularly high modulus organic fibers such as, for example, para- and meta-aramid fibers, nylon fibers, polyester fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. In some instances, fibers in the layer 400 are chemically treated. The fiber content in the layer 400 may be from about 20% to about 90% by weight of the layer, more particularly from about 30% to about 70%, by weight of the layer. The particular size and/or orientation of the fibers used may depend, at least in part, on the thermoplastic polymer material used and/or the desired properties of the layer 400. Suitable additional types of fibers, fiber sizes and amounts will be readily selected by the person of ordinary skill in the art, given the benefit of this disclosure. In one non-limiting illustration, fibers dispersed within a thermoplastic material and optionally a lofting agent to provide the skin layer 400 can generally have a diameter of greater than about 5 microns, more particularly from about 5 microns to about 22 microns, and a length of from about 5 mm to about 200 mm, more particularly, the fiber diameter may be from about 40 microns to about 22 microns and the fiber length may be from about 5 mm to about 75 mm. In some embodiments, the reinforcing fibers form a web that is held in place by the thermoplastic material of the layer 400. The web is generally porous, e.g., comprises 5% or more porosity, and is permeable to gases. In some instances, the pores of the layer 400 may comprise additives including flame retardants, particles or other materials. Illustrative basis weights for the layer 400 include, but is not limited to, about 100 gsm to about 2000 gsm, more particularly about 300 gsm to about 1500 gsm or about 500 gsm to about 1200 gsm. If desired, the layer 400 may be halogen free or may comprise halogenated materials or other materials such as lofting agents, flame retardants, etc.

Figure 5:
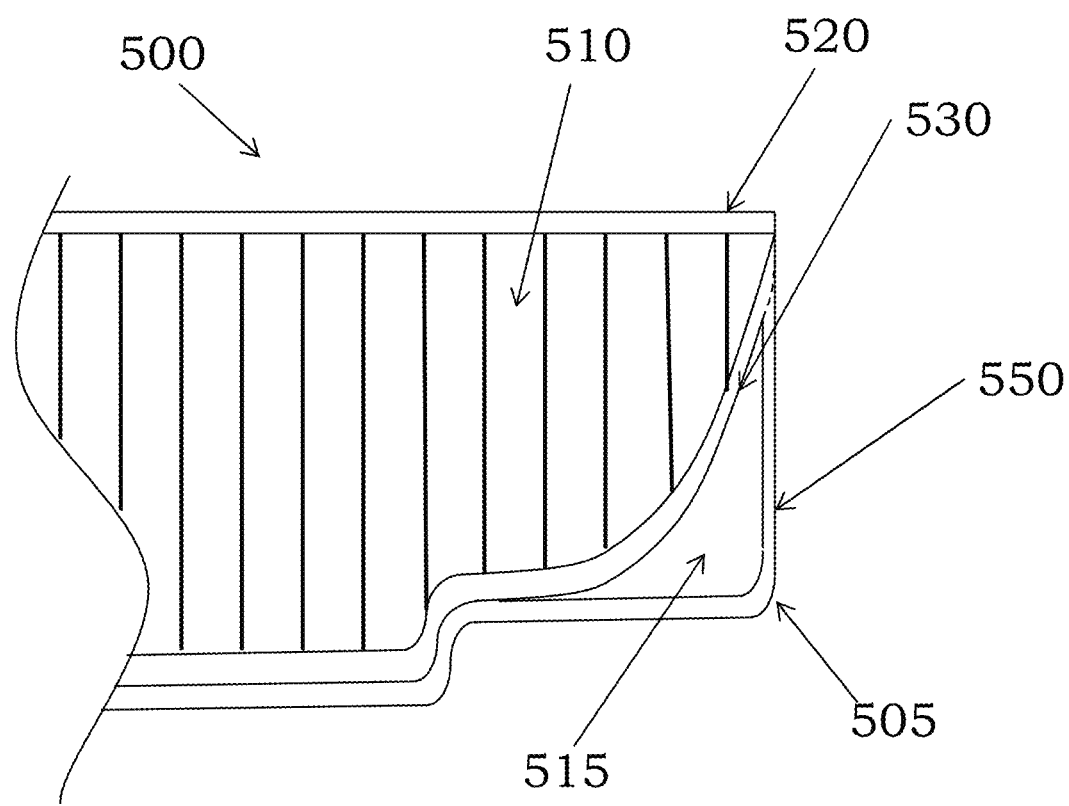
FIG. 5 is an illustration of a composite panel, in accordance with certain examples.

In certain embodiments, a cross-section of a composite panel 500 comprising a shell layer is shown in FIG. 5. The composite panel 500 comprises a core layer 510, skins 520, 530 and a shell layer 550. An aesthetic edge 505 is present at one side of the composite panel 500. If desired, an air gap 515 can be present between the skin 530 and the shell layer 550 or this air gap 515 can be filled in with a foam or other material. As noted in more detail below, the presence of the air gap 515 provides a channel in which interconnects, cables or other items may be located in the air gap 505 of the composite panel 500. While not shown, another edge of the composite panel 500 may also comprise an aesthetic edge similar to the edge 505.

In some embodiments, a basis weight of the skin 520 may be about the same basis weight of the skin 530 and shell layer 550 combined. For example, the basis weight of the skin 530 can be selected to be less than that of the skin 520 so when the shell layer 550 is coupled to the skin 530, the combined basis weight of the skin 530 plus shell layer 550 is about the same as the basis weight of the skin 520.

Figure 6:
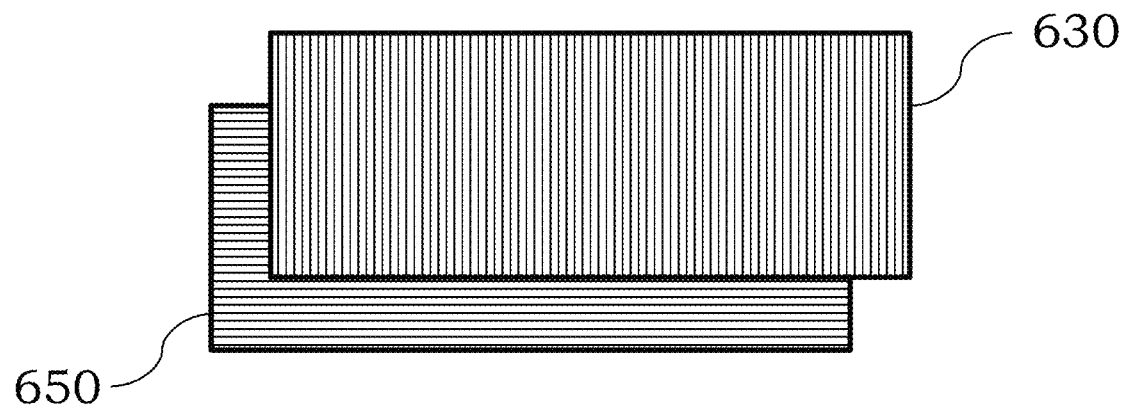
FIGS. 6, 7, 8 and 9 are illustrations of a skin layer and shell layer comprising fibers of different orientations, in accordance with some embodiments.

In other embodiments, the fiber loading and/or fiber direction in the skins 520, 530 and shell layer 550 can be selected such that fibers in different layers are present in different orientations. Referring to FIG. 6, an illustration is shown where a shell layer 650 comprises fibers oriented in a first direction and a skin 630 comprises fibers oriented in a second direction. One of the layers 630, 650 could have fibers randomly oriented if desired. The shell layer 650 and the skin 630 are shown being separated for ease of description. The fiber orientations shown in FIG. 6 can be swapped if desired. In either case, coupling of the skin 630 to the shell layer 650 provided a composite material with fibers running in different directions.

Figure 7:
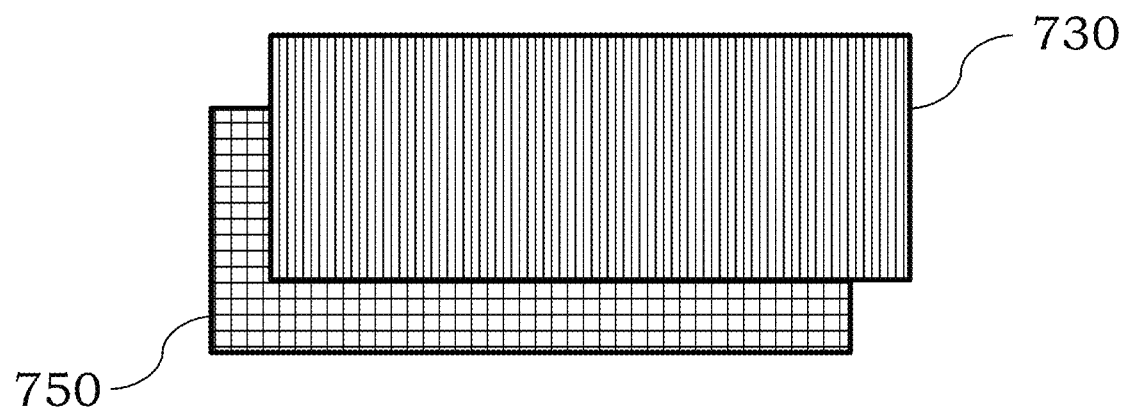

In other embodiments, a shell layer may comprise bidirectional fibers and the skin layer may comprise a unidirectional or random arrangement of fibers. Referring to FIG. 7, a shell layer 750 comprises bidirectional fibers, and a skin 730 comprises a unidirectional fiber arrangement, though the fibers in the skin 730 could be randomly oriented. The bidirectional fibers of the shell layer 750 need not be arranged in a 0/90 direction as shown in FIG. 7. Instead, the fibers can be arranged in a 0/(>0-90) arrangement with some fibers being non-parallel to other fibers.

Figure 8:
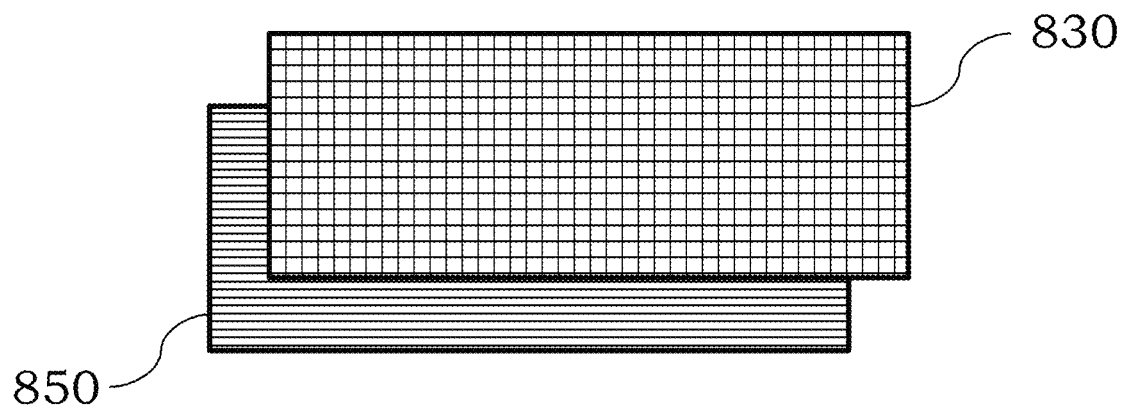

In other embodiments, a shell layer may comprise unidirectional fibers (or randomly distributed fibers) and the skin layer may comprise a bidirectional arrangement of fibers. Referring to FIG. 8, a shell layer 850 comprises unidirectional fibers, and a skin 830 comprises a bidirectional fiber arrangement. The bidirectional fibers of the skin 830 need not be arranged in a 0/90 direction as shown in FIG. 8. Instead, the fibers can be arranged in a 0/(>0-90) arrangement with some fibers being non-parallel to other fibers.

Figure 9:
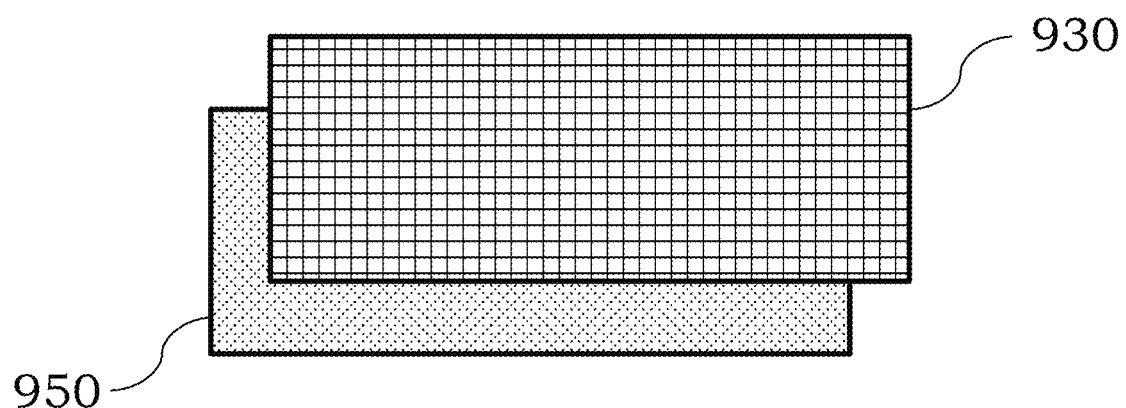

In some examples, a shell layer may comprise bidirectional arrangement of fibers and the skin layer may comprise a bidirectional arrangement of fibers. Referring to FIG. 9, a shell layer 950 comprises bidirectional fibers, and a skin 930 comprises a bidirectional fiber arrangement. The bidirectional fibers of each of the skin 930 and the layer 950 need not be arranged in a 0/90 direction as shown in FIG. 9. Instead, the fibers can be arranged in a 0/(>0-90) arrangement with some fibers being non-parallel to other fibers.

Figure 10:
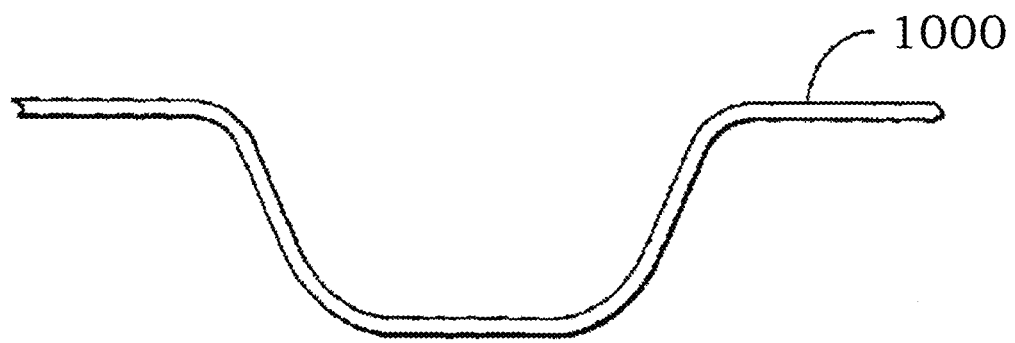
FIG. 10 is an illustration of a load floor, in accordance with certain examples.

In some examples, the composite articles described herein can be present in a vehicle load floor. One illustration is shown in FIG. 10. A side view of a drawn article 1000 that can be used as a vehicle load floor is shown. The article 1000 is typically positioned in the rear portion of the vehicle, e.g., a rear storage portion of a sport utility vehicle or minivan, and is designed to receive components, gear, luggage, a spare tire, etc. for storage. A lid or covering (not shown) may also be present to enclose the components within the vehicle load floor 1000 and shield them from view. The load floor 1000 may comprise, for example, a composite article with an aesthetic edge as described herein or other similar articles comprising an aesthetic edge that will be selected by the person of ordinary skill in the art, given the benefit of this disclosure. In some instances, the load floor 1000 provides sufficient weight bearing capacity so that no underlying support members from the vehicle need be present to support it.

In some embodiments and as noted herein, the presence of a shell layer and sandwich panel in a load floor can provide an air gap through which one or more wires, interconnects, cables or other devices may be routed. For example, the air gap of the load floor may comprise wiring to permit USB charging using a port or other device present on the load floor or a lid thereof. In other instances, the load floor may comprise a charging or power port electrically coupled to one or more wires routed through the air gap. The charging or power port can be used to charge or power phones, pumps, inflators, back-up battery sources or other devices which may be present on or near the load floor or a lid thereof.

In other instances, the composite panel may be present or configured as a table that can be removed from a vehicle such as a recreational vehicle (RV) van, truck or the like. For example, the composite panel may be configured or part of a dinette table of a recreational vehicle. The table can be removed from the vehicle and placed outside of the vehicle for use. In some instances, the table may comprise an interconnect, on-board battery or other power source or other electronic means part of which may be present in the air gap of the composite panel. If desired, one or more surface of the table may also comprise a photovoltaic cell to permit moving of the table outside of the RV and use of the table as a solar cell to charge the batteries of the RV or power the RV.

In other embodiments, the composite panels described herein may be used as structural panels. For example, the aesthetic edge on the panels permit it use as wall panels, cubicle panels, ceiling panels, ceiling tiles or other applications of panels and tiles in the building industry. Other applications of structural panels that comprise an aesthetic edge will be selected by the skilled person in the art, given the benefit of this disclosure.

In certain embodiments, the skins and shell layers described herein can be generally prepared using the reinforcing fibers and a thermoplastic material optionally in combination with a flame retardant material or other materials. To produce the layers, a thermoplastic material, reinforcing fibers and optionally other materials can be added or metered into a dispersing foam contained in an open top mixing tank fitted with an impeller. Without wishing to be bound by any particular theory, the presence of trapped pockets of air of the foam can assist in dispersing the reinforcing fibers, the thermoplastic material and any other materials. In some examples, the dispersed mixture of fibers and thermoplastic can be pumped to a head-box located above a wire section of a paper machine via a distribution manifold. The foam, not the fibers, or thermoplastic, can then be removed as the dispersed mixture is provided to a moving support such as a wire screen using a pressure, continuously producing a uniform, fibrous wet web. The wet web can be passed through a dryer at a suitable temperature to reduce moisture content and to melt or soften the thermoplastic material. When the hot web exits the dryer, another layer such as an optional film or other materials can be laminated onto the web by passing the web of reinforcing fiber, thermoplastic material and film through the nip of a set of heated rollers. If desired, additional layers such as, for example, another film layer, scrim layer, etc. may also be attached along with the film to one side or to both sides of the web to facilitate ease of handling the produced layer or composite. The composite can then be passed through tension rolls and continuously cut (guillotined) into the desired size for later forming into an end composite article. Further information concerning the preparation of such composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

In some embodiments, a shell layer is first prepared as described above and match molded to a shape and dimensions suitable for coupling to a sandwich panel. The sandwich panel can be prepared separately and then coupled to the shell layer through an adhesive, film or other materials. The entire coupled layers can be heated if desired. In other instances, the shell layer is first prepared and match molded and a skin is added to the shell layer optionally using an adhesive or film between the shell layer and the skin. The core layer may then be placed on the added skin with an optional adhesive or film between the core layer and skin. A second skin may then be placed on top of the core layer with an optional adhesive or film between the core layer and the second skin. The resulting composite article can be heated to bond the various layers to each other. An optional decorative layer or other surface layer can then be added to one or more surface of the composite article as desired.

Figure 11:
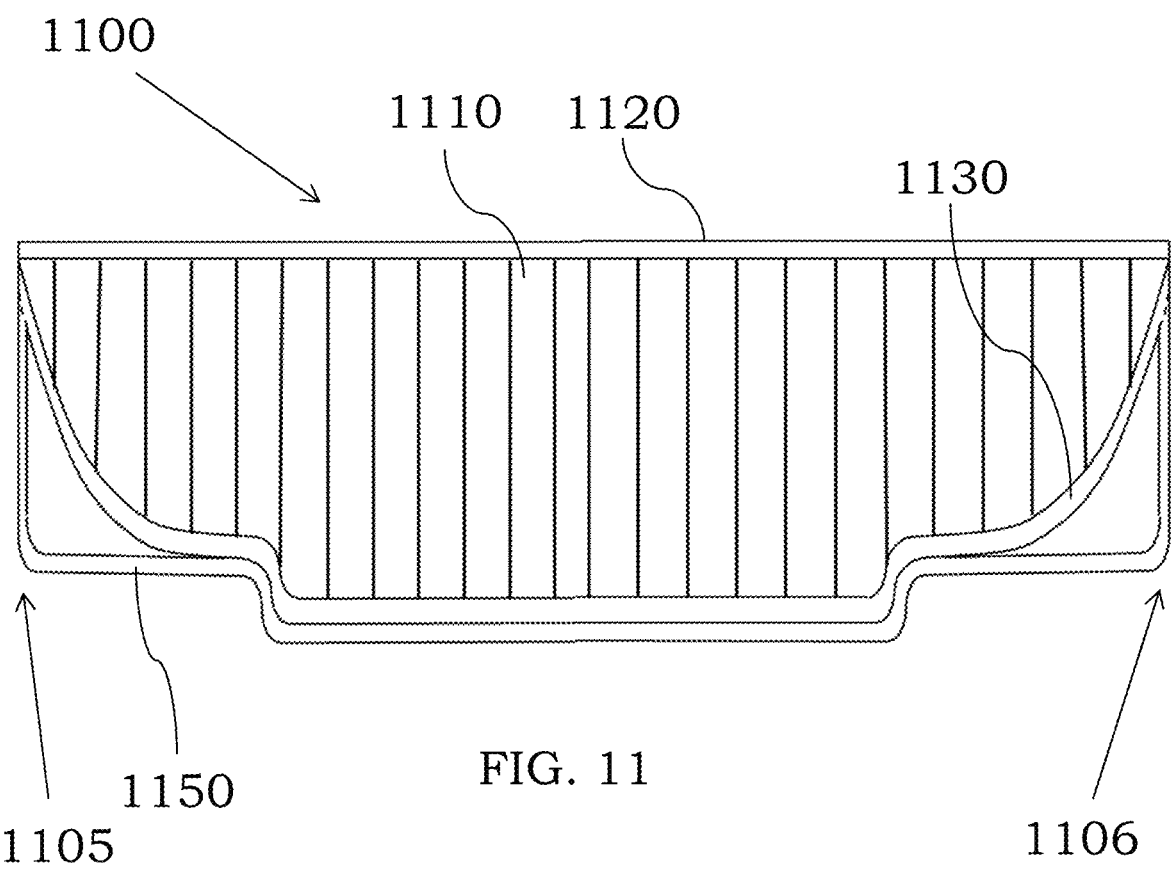
FIG. 11 is an illustration of a composite article comprising an aesthetic edge at each side, in accordance with some examples.

In certain embodiments, the panels described herein may comprise an aesthetic edge at each side of the panel. Referring to FIG. 11, a panel 1100 is shown comprising aesthetic edges 1105, 1106. If desired, an air gap can be present between a second skin 1130 and the shell layer 1150 at each side of the panel 1100. The panel 1100 may also comprise a core layer 1110 and a skin 1120. An optional decorative layer (not shown) may also be present.

When introducing elements of the examples disclosed herein, the articles "a," "an," "the" and "said" are intended to mean that there are one or more of the elements. The terms "comprising," "including" "with" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A composite article comprising:
   a sandwich panel comprising a first porous skin comprising a web of randomly arranged reinforcing fibers held in place by a thermoplastic material, a second porous skin comprising a web of randomly arranged reinforcing fibers held in place by a thermoplastic material, and a core layer positioned between the first skin and the second skin; and
   a shell layer coupled to the sandwich panel through the second skin, wherein the shell layer and sandwich panel together provide an aesthetic edge to the composite article.

2. The composite article of claim 1, wherein a basis weight of the shell layer and the second porous skin together are a same basis weight as a basis weight of the first porous skin.

3. The composite article of claim 1, wherein the composite article comprises four sides with a first side being opposite a third side and a second side being opposite a fourth side, wherein the second porous skin is arranged in a machine direction from the first side to the third side, and wherein the shell layer is arranged in a machine direction from the second side to the fourth side.

4. The composite article of claim 1, further comprising an air gap at the aesthetic edge, wherein the air gap is present between the shell layer and the second porous skin.

5. The composite article of claim 4, wherein the composite article comprises at least two aesthetic edges each with an air gap, wherein each of the air gaps is present between the shell layer and the second porous skin.

6. The composite article of claim 1, wherein the reinforcing fibers in each of the first skin and the second skin comprises one or more of glass fibers, carbon fibers, graphite fibers, synthetic organic fibers, nylon fibers, polyester fibers, mineral fibers, mineral wool fibers, wollastonite, alumina silica, metal fibers, metalized natural and/or synthetic fibers, ceramic fibers, yarn fibers, or mixtures thereof.

7. The composite article of claim 6, wherein the thermoplastic material in each of the first porous skin and the second porous skin comprises a polyolefin material.

8. The composite article of claim 1, further comprising a decorative layer coupled to the first porous skin of the sandwich panel.

9. The composite article of claim 1, wherein the core layer comprises a cellulose material or a non-cellulose material.

10. The composite article of claim 1, wherein a thickness of the composite article is about 5 mm to about 100 mm.

11. A vehicle load floor sized and arranged to cover a rear interior section of a vehicle, the vehicle load floor comprising:
   a decorative layer facing an interior of the vehicle; and
   a load floor substrate coupled to the decorative layer, the load floor substrate comprising:
      a sandwich panel coupled to the decorative layer, the sandwich panel comprising a first porous skin comprising a web held of randomly arranged reinforcing fibers held in place by a thermoplastic material, a second porous skin comprising a web of randomly arranged reinforcing fibers held in place by a thermoplastic material, and a core layer positioned between the first skin and the second skin; and
      a shell layer coupled to the sandwich panel through the second skin, wherein the vehicle load floor comprises an aesthetic edge.

12. The vehicle load floor of claim 11, wherein a basis weight of the shell layer and the second porous skin together are a same basis weight as a basis weight of the first porous skin.

13. The vehicle load floor of claim 11, wherein the load floor substrate comprises four sides with a first side being opposite a third side and a second side being opposite a fourth side, wherein the second porous skin is arranged in a machine direction from the first side to the third side, and wherein the shell layer is arranged in a machine direction from the second side to the fourth side.

14. The vehicle load floor of claim 11, wherein the vehicle load floor comprises an air gap at the aesthetic edge, wherein the air gap is present between the shell layer and the second porous skin.

15. The vehicle load floor of claim 14, wherein the vehicle load floor comprises at least two aesthetic edges each with an air gap, wherein each of the air gaps is present between the shell layer and the second porous skin.

16. The vehicle load floor of claim 11, wherein the reinforcing fibers in each of the first skin and the second skin comprises one or more of glass fibers, carbon fibers, graphite fibers, synthetic organic fibers, nylon fibers, polyester fibers,- mineral fibers, mineral wool fibers, wollastonite, alumina silica, metal fibers, metalized natural and/or synthetic fibers, ceramic fibers, yarn fibers, or mixtures thereof.

17. The vehicle load floor of claim 16, wherein the thermoplastic material in each of the first porous skin and the second porous skin comprises a polyolefin material.

18. The vehicle load floor of claim 11, further comprising a second decorative layer coupled to an underside of the vehicle load floor.

19. The vehicle load floor of claim 11, wherein the core layer comprises a cellulose material or a non-cellulose material.

20. The vehicle load floor of claim 11, wherein a thickness of the vehicle load floor is about 5 mm to about 30 mm.

* * * * *